United States Patent [19]

Kawakubo et al.

[11] Patent Number: 4,950,443

[45] Date of Patent: Aug. 21, 1990

[54] PROCESS FOR PRODUCING CARBON PRODUCT WITH COARSE AND DENSE STRUCTURE

[75] Inventors: Takamasa Kawakubo, Tano; Mitsuru Yoshida, Fujioka; Yoshihisa Suda, Maebashi, all of Japan

[73] Assignee: Mitsubishi Pencil Co., Ltd., Tokyo, Japan

[21] Appl. No.: 349,084

[22] Filed: May 9, 1989

Related U.S. Application Data

[63] Continuation of Ser. No. 141,415, Jan. 7, 1988, abandoned.

[51] Int. Cl.$^5$ .............................................. B05D 3/02
[52] U.S. Cl. .................................. 264/29.5; 264/29.6; 264/43; 264/129; 264/126; 423/449
[58] Field of Search ............................ 264/29.1–29.7, 264/42, 44, 43, 105, 126, 129; 423/449

[56] References Cited

U.S. PATENT DOCUMENTS

| | | | |
|---|---|---|---|
| 3,266,893 | 8/1966 | Duddy | 264/44 |
| 3,370,113 | 2/1968 | Goeddel | 264/29.1 |
| 3,634,569 | 1/1972 | Emanuelson et al. | 264/105 |
| 3,969,124 | 7/1976 | Stewart | 264/29.5 |
| 4,704,327 | 11/1987 | Schieber | 264/119 |
| 4,822,538 | 4/1989 | Yoshida et al. | 264/29.6 |

FOREIGN PATENT DOCUMENTS

| | | | |
|---|---|---|---|
| 0175877 | 4/1986 | European Pat. Off. | 264/29.1 |
| 39-25287 | 11/1964 | Japan | 264/29.1 |
| 60-155516 | 8/1985 | Japan | 264/29.1 |
| 60-239358 | 11/1985 | Japan | 264/29.1 |

*Primary Examiner*—Jeffery Thurlow
*Attorney, Agent, or Firm*—Oliff & Berridge

[57] ABSTRACT

A process for producing a carbon product having coarse and dense structures by carbonizing moldings of a mixture of one or more types of organic polymer substance, asphalt pitches, dry distilled pitches to obtain a dense structure carbon by carbonizing in an inert gas atmosphere or with a mixture of fine particle graphite powder as required, and porous organic polymer produced in point contact between the particles by solubilizing the surface layers of the organic polymer particles to obtain coarse structure carbon by sintering in particle state by carbonizing in an inert gas atmosphere, in an inert gas atmosphere after solidification to integrally mold organic liquid composition remaining high carbon residue in a composite composition, and carbonizing the composite composition in an inert gas atmosphere. Thus, a carbon product of continuously irregular quality having coarse and dense structure as designed by integrally producing a porous carbon having high strength and uniform porosity distribution with dense structure carbon moldings can be produced.

12 Claims, No Drawings

PROCESS FOR PRODUCING CARBON PRODUCT WITH COARSE AND DENSE STRUCTURE

This is a continuation of application Ser. No. 07/141,415 filed Jan. 7, 1988, now abandoned.

BACKGROUND OF THE INVENTION

The present invention relates to a process for producing a carbon product of coarse and dense structure and, more particularly, to such a process for producing a carbon product having a coarse and dense structure in which coarse structure carbon moldings and dense structure carbon moldings are alternatively constructed.

In this specification, the word carbon includes carbonaceous materials and graphite, the phrase coarse structure means a structure made of a porous carbon, and the phase dense structure means a structure of carbon material which is formed by adding a binder and, as required, a filler, precarbonizing the mixture by an ordinary method, then carbonizing it in an inert gas atmosphere. The structure of ultrafine cracks at the binder section which should occur in the carbonizing step is not termed a porous structure. The molded state in an arbitrary shape by a molding machine or the state produced by solubilizing the surfaces of organic polymer particles to point contact the particles and bonding the particles to obtain the coarse structure after mixing and kneading a mixed structure to obtain a dense structure is called "a green state". Further, a precarbonized state is the state produced by insolubilizing or infusibilizing the molding of the green state by means such as a process for adding a carbonization accelerating catalyst, a crosslinking agent or a polymerization starter, a process for oxidizing, a process for heating and crosslinking at 50° to 300° C. in an atmosphere of $Cl_2$, $O_3$, or air, or a process for crosslinking and curing by emitting ultraviolet rays, electron beam, or other radiation beam.

A carbon product has excellent oxidation resistance and medicine resistance, is not fusibly deformed in an nonoxidative atmosphere but exhibits excellent heat resistance and corrosion resistance. A porous material which is formed of the carbon having such excellent properties may be utilized for various types of filters for isolating solid in liquid, catalytic carrier, activated charcoal or adsorber by imparting or treating with a medicine, or a light-weight structure, a heat insulator, electrodes for a battery, or a panel heater. Dense structure carbon moldings are used for a heat exchanger distillation unit, an evaporator, an adsorber, a condenser, or a filter.

However, the carbon molding produced by integrating the coarse structure carbon and dense structure carbon formed of porous materials is not yet obtained at present. If this is produced, its utility is expected in further wide fields.

SUMMARY OF THE INVENTION

Accordingly, an object of the present invention is to provide a process for producing a carbon product of continuously irregular quality having coarse and dense structure as designed by integrally producing a porous carbon having high strength and uniform porosity distribution with dense structure carbon moldings.

To achieve the foregoing object of the present invention, the inventors have undertaken a study to develop and have proposed a process for producing a carbon product having a coarse structure by precarbonizing green state moldings of mixed composition for fundamentally obtaining a dense structure carbon by carbonizing in an inert gas atmosphere, precarbonized state molding or a composite produced by integrally molding a carbonized carbide and chorinated vinyl chloride resin particles with a liquid composition, and carbonizing it in an inert gas atmosphere (Japanese Patent Application No. 138347/1982). However, this process has such drawbacks that can produce only a carbon product having relatively thin coarse structure carbon. In such circumstances the coarse structure carbon part and dense structure carbon part can crack at the precarbonizing and carbonizing steps in weak bond between both structure parts.

The inventors have further studies and succeeded to develop a process for producing a carbon product having coarse and dense structures by carbonizing moldings of a mixture of one or more types of organic polymer substances, asphalt pitches, dry distilled pitches to obtain a dense structure carbon by carbonizing in an inert gas atmosphere or with a mixture of fine particle graphite powder as required, and porous organic polymer produced in point contact between the particles by solubilizing the surface layers of the organic polymer particles to obtain coarse structure carbon by sintering the particle state by carbonizing in an inert gas atmosphere, in an inert gas atmosphere after solidification to integrally mold organic liquid composition remaining high carbon residue in a composite composition, and carbonizing the composite composition in an inert gas atmosphere, thereby eliminating the above-described drawbacks and disadvantages. The addition of the graphite powder incidentally contributes to the improvement in the molding stability.

A process for producing a carbon product having a coarse and dense structure according to the present invention will now be described in more detail.

Green state moldings to become dense structure carbon are formed by carbonizing in an inert gas atmosphere. The green moldings are produced by uniformly mixing a mixture of one or more of organic high molecular substances, asphalt pitches and dry distilled pitches as well as a mixture with fine particle graphite powder in a mixing machine such as a Henschel mixer, then kneading the mixture by a kneader for applying high shearing force such as a press kneader, two rolls, three rolls or cokneader under heating, and molding the kneaded mixture into an arbitrary shape such as in a plate or rod shape by calender rolls, an extrusion molding machine or an injection molding machine. The green state moldings are then precarbonized, thereby producing moldings of precarbonized state. The organic high molecular substance used include thermoplastic resins such as polyvinyl chloride, polyacrylonitrile, polyvinyl alcohol, polyvinyl chloridevinyl acetate copolymer; thermosetting resins such as phenol resin, furan resin, epoxy resin, unsaturated polyester; natural high molecular substance such as lignin, cellulose; and synthetic high molecular substance in a fundamental structure of a molecule with condensate polycyclic aromatic group such as formalin condensate of naphthalenesulfonic acid. The asphalt and pitches include petroleum asphalt, coal tar pitch, naphtha decomposed pitch or dry distillate lower than 400° C. of hydrocarbon compound of synthetic resin. Then, since any of the moldings of green state to produce dense structure carbon and moldings of precarbonized state and the porous carbon of green state and precarbonized state to produce coarse structure carbon are bonded at the stage of carbonized state, precarbonized material and carbide of arbitrary shape, organic liquid composition comprising a mixture of one or more of the organic high molecular substance, asphalt pitches, and dry distilled pitches and a mixture of fine particle graphite powder are coated. The organic high molecular substance includes thermoplastic resins such as polyvinyl chloride, polyacrylonitrile; thermosetting resins such as phenol resin, furan resin, and natural high molecular substances such as tragacanth gum. The asphalt pitches include petroleum asphalt and coal tar pitch. The graphic has 0.5 to 15 microns of average particle size.

The organic high molecular substance, pitches and graphite to be used are preferably the same as those used for forming a dense structure portion because of strengthening of the bonding strength. The materials which do not exhibit liquid state at the ambient temperature are dissolved in the initial condensate of resin or solvent. At this time, the bonding strength may be increased by adding 5 to 50 wt. parts of graphite.

Then, the organic liquid composition is used as a binder, and the coarse structure part and the dense structure part are bonded. For example, in case that a laminated product of coarse and dense structure having a square bottom is produced, any of green state moldings and precarbonized moldings to produce dense structure carbon of a bottom square coated with organic liquid composition is placed on the organic polymer porous materials of green state or precarbonized state of the bottom square shape. Then, this operation is repeated until desired number of laminates is obtain. Similarly, in case that a carbon product having a dense structure at the inside and a coarse structure at the outside is produced, organic polymer porous materials having holes of desired shape therein is prepared, and the moldings of acicular green state or precarbonized state to produce a dense structure carbon coated with organic liquid composition are inserted into the holes.

Then, the organic liquid composition is heated, treated with solvent remover and solidified, thereby bonding the coarse structure and the dense structure. After the shape is thus regulated, the precarbonizing step is performed or not performed as required, the material is then carbonized by heating at 800° C. or higher and preferably at 1,000° C. or higher in an inert gas atmosphere. Thus, the carbon product having a coarse structure that the coarse structure and the dense structure are bonded is produced. At this time, the carbonizing temperature does not have an upper limit, and the material may be heated to approx. 3,000° C. as required. Since the porous materials formed of organic polymer particles are sintered between the particles to form a mesh structure without completely fusing the resin in the heating step and carbonized as they are, rigid porous carbon having continuous pores can be obtained. In order to obtain preferable bonding between the coarse structure and the dense structure, it is preferred to precarbonize the material at a heating velocity of 3° to 100° C./hr. and more preferably 5° to 50° C./hr. up to 500° C. No particular limit exists on the heating velocity from 500° C. The porous carbon thus obtained as described above exhibits high strength. In order to increase the diameter of the particles in the pores of the porous carbon, particles having large diameter may be used. In order to decrease the diameter of the particles in the pores of porous carbon, the particles having small diameter may be used.

DESCRIPTION OF THE PREFERRED EMBODIMENTS

The present invention will be more concretely described with respect to the Examples.

EXAMPLE 1

50 wt. parts of furan resin initial condensate (Hitafuran VF-302 produced by Hitachi Chemical Co., Ltd., Japan), 30 wt. parts of chorinated vinyl chloride resin powder (Nikatemp T-870 produced by Nippon Carbide Industries Co., Ltd., Japan) having 67% of chlorine content and 740 of polymerization and 20 wt. parts of graphite powder having an average grain size of 7 microns (CSP produced by Nippon Graphite Co., Ltd., Japan) were evenly mixed by a Henschel mixer. Then, the mixture was sufficiently kneaded by two heated rolls. After the mixture was kneaded, a plate having a thickness of 1.5 mm was molded by calender rolls. The placed plate was obtained in a heating oven, and precarbonized at 150° C. for 4 hours and then at 180° C. for 8 hours, thereby obtaining a precarbonized material. This plate was cut in a square of 50 mm (longitudinal)×50 mm (lateral), and an organic liquid composition having 70 wt. parts of furan resin initial condensate and 30 wt. parts of graphite powder was coated on one side of the plate. Then, the chlorinated vinyl chloride resin powder was charged by a vibrator in a graphite box, kept in a heated oven, heated at 180° C. for 20 hours, porous material having a thickness of 20 mm of chlorinated vinyl chloride. The porous material was cut in size having 50 mm (longitudina)×50 mm (lateral). Subsequently, the porous material and the plate coated with the organic liquid composition were bonded, and the liquid was solidified at 80° C. in an air bath. Then, it is calcined at 10° C./hr. from the ambient temperature to 300° C., 30° C./hr. from 300° C. to 500° C. and 200° C./hr. above 1,000° C., thereby obtaining carbon moldings having a coarse and dense structure after cooling.

The size of the molding was 41 mm (longitudinal)×41 mm (lateral)×16 mm (height).

EXAMPLE 2

The mixture kneaded by two heated rolls in the Example 1 was pelletized by a pelletizer, and extruded by a screw extrusion molding machine, thereby obtaining rod moldings having a 2 mm diameter. The rod moldings were then placed in a heated oven, precarbonized at 180° C. for 10 hours, cut in length of 50 mm, and the organic liquid composition in the Example 1 was coated on the entire side surfaces. Then, a pipe-shaped porous material having 20 mm diameter×50 mm length and a hole 2 mm in diameter perforated at the inside was formed from the chlorinated vinyl chloride porous material of the Example 1. The rod coated with the organic liquid composition was inserted into the porous material and bonded, and the liquid portion was solidified at 80° C. in an air bath. This calcined at 10° C./hr. from room temperatures up to 300° C., 20° C./hr. from 300° C. to 500° C., and 100° C./hr. from, 500° C. to 1,000° C. in nitrogen gas atmosphere, thereby obtaining carbon moldings having a dense structure. After cooling, the carbon moldings having coarse structure and dense structure was produced. The size of outer profile of the moldings was 15.5 mm diameter and 39 mm in length.

EXAMPLE 3

80 wt. part of chlorinated vinyl chloride resin particles (T-025 produced by Nippon Carbide Industries Co., Ltd., Japan), 20 wt. parts of graphite having average particle size of 7 microns, and 15 wt. parts of dioctyl phthalate as a plasticizer were mixed in a Henschel mixer. Then, the mixture was sufficiently kneaded by two rolls. After the kneading, the kneaded mixture was pelletized by a pelletizer, extrusion molded by a plunger type hydraulic molding machine into 30 mm (longitudinal)×5 mm (lateral), thereby obtaining a plate. This plate was cut in length of 50 mm, thereby obtaining green moldings. Three moldings were prepared, one was bonded to the front surface, the second was bonded to both side surfaces, the third was bonded to the back surface, and organic liquid composition containing chlorinated vinyl chloride resin, graphite and tetrahydrofuran was coated.

Subsequently, a hardener was added to furan initial condensate (Hitafuran VF-302 produced by Hitachi Chemical Co., Ltd., Japan), the mixture was crosslinked by three heated rolls to produce a sheetlike composition having 150° C. of softening point, the composition was then cooled and pulverized. The pulverized composition was filled by a vibrator in a graphite box, placed in a heated oven, and heated at 150° C. for 10 hours to produce furan resin porous material. Two porous plates cut in 30 mm (longitudinal)×50 mm (lateral)×10 mm (thickness) were prepared from the porous material. The porous plates were interposed between the plates coated with the organic liquid composition, bonded thereto, and the liquid portion was solidified at 70° C. in an air bath. Then, the laminate was calcined at 10° C./hr. from the ambient temperature to 300° C., at 20° C./hr. from 300° C. to 500° C., and at 50° C./hr. from 500° C. to 1,500° C. in a nitrogen gas atmosphere. After cooling, a carbon multilayer unit having coarse and dense structure was obtained.

The molding had 23.5 mm (longitudinal)×41 mm (lateral)×29 mm (height).

What is claimed is:

1. A process for producing a composite carbon product, comprising:
    molding a mixture of graphite particles and at least one member selected from the group consisting of organic high molecular weight polymers, asphalt pitches and dry distilled pitches, thereby producing a dense molding;
    molding and fusing organic polymer particles to each other to produce a porous molding in which polymer particles are point contact bonded to each other;
    bonding said dense molding and said porous molding together using an organic liquid composition to produce a composite article; and
    carbonizing said composite article in an inert gas atmosphere.

2. The process according to claim 1, wherein said moldings are precarbonized prior to being bonded together.

3. The process according to claim 1, wherein said organic polymer particles have a maximum diameter of 1 mm, and at least 90% of the particles have a diameter of at least 30 microns.

4. The process according to claim 1, wherein said organic polymer particles comprise particles of at least one thermoplastic resin selected from the group consisting of chlorinated vinyl chloride, polyacrylonitrile, polydivinyl alcohol, polyphenylene ether, and polydivinyl benzene.

5. The process according to claim 1, wherein said organic polymer particles are fused by fusing by heating the organic polymer particles to produce point contacts to bond the particles to each other.

6. The process according to claim 1, wherein said organic liquid composition comprises at least one member selected from the group consisting of organic polymer, asphalt pitches, and dry distilled pitches.

7. The process according to claim 6, wherein said organic liquid composition further comprises fine particle graphite powder.

8. The process according to claim 1, wherein said carbonizing is performed by heating to at least 800° C.

9. The process of claim 1 wherein said organic polymer particles comprise pulverized particles of monomer or initial condensate of at least one thermosetting resin selected from the group consisting of furan, phenol, bismalimide, and triazine.

10. The process of claim 1 wherein said organic polymer particles comprise natural polymer particles having condensate polynucleated aromatic group.

11. The process of claim 1 wherein said organic polymer particles comprise particles which have been pulverized from dry distilled pitches heat treated at 300° to 500° C. and separated from low polymer compounds by a solvent.

12. The process of claim 1 wherein said organic particles are fused together by a solvent to produce point contact bonding of the particles to each other.

* * * * *